United States Patent [19]

Tracy

[11] 4,057,092

[45] Nov. 8, 1977

[54] PNEUMATIC TIRE FOR USE WHEN DEFLATED

[75] Inventor: Frank R. Tracy, Wellington, Ohio

[73] Assignee: The General Tire & Rubber Company, Akron, Ohio

[21] Appl. No.: 666,515

[22] Filed: Mar. 12, 1976

Related U.S. Application Data

[63] Continuation-in-part of Ser. No. 589,223, June 23, 1975, abandoned.

[51] Int. Cl.² ............... B60C 17/00; B60C 15/00; B60C 13/00
[52] U.S. Cl. .................. 152/379.1; 152/353 R; 152/362 R; 152/362 CS; 152/330 RF; 152/330 L
[58] Field of Search ............ 152/352, 353 R, 353 C, 152/354, 357, 359, 361 FP, 362 R, 362 CS, 330 RF, 330 L, 379, 379 R

[56] References Cited

U.S. PATENT DOCUMENTS

| 2,037,640 | 4/1936 | MacMillan | 152/353 R |
| 2,874,745 | 2/1959 | Wann | 152/353 R |
| 3,612,137 | 10/1971 | Guyot | 152/362 R |
| 3,709,276 | 1/1973 | Montague | 152/362 R |
| 3,717,190 | 2/1973 | Boileau | 152/361 FP |
| 3,739,829 | 6/1973 | Powell et al. | 152/330 L |
| 3,861,438 | 1/1975 | Bertelli et al. | 152/330 RF |
| 3,951,192 | 4/1976 | Gardner et al. | 152/362 CS |

Primary Examiner—Drayton E. Hoffman

[57] ABSTRACT

A pneumatic tire is disclosed to run while flat without the tire coming off the wheel rim and without excessive heat due to the friction from the rubbing of the sidewall portions. A circumferential locking lug on the sidewall exterior adjacent to the rim flange locks over the flange when the tire goes flat, keeping the tire on the wheel rim. To improve stability and to cushion the load while running the tire flat, inserts of cord material or hard rubber may be inserted into the sidewall, or the sidewall thickness may be increased with concentric slots added. Internal friction is decreased by coating the interior of the sidewalls with a lubricant.

2 Claims, 10 Drawing Figures

PNEUMATIC TIRE FOR USE WHEN DEFLATED

This application is a continuation-in-part of U.S. Ser. No. 589,223 filed June 23, 1975, now abandoned.

BACKGROUND OF THE INVENTION

1. Field of the Invention

This invention relates to pneumatic tires for vehicles and specifically to a tire designed to run while deflated or underinflated.

2. Description of the Prior Art

A basic problem with all pneumatic tires is that they occasionally become underinflated or completely deflated and when this occurs, the tire must be changed and a spare tire put on. In some cases a blowout can cause the vehicle to go out of control.

A tire which can be run flat has for some time been a desirable objective in the tire-making art. If a tire could be run flat for an appreciable distance, the driver could run on the flat tire until a replacement tire was obtained or the tire repaired. This would eliminate changing tires on the road and dependence on a spare. A driver could also run on the suddenly deflated tire until a safe place to stop the car is found, thus avoiding sudden stopping on crowded streets and highways.

There are many problems associated with running a conventional tire flat. A flat tire is unstable, making steering difficult. The lack of inflation pressure causes the tire beads to unseat, and eventually the tire may come off the wheel rim. In addition, riding with a flat tire can be an uncomfortable experience since there is practically no cushion between the wheel rim and the road surface.

A number of designs have been proposed to increase the stability and rideability of the tire when deflated or flat. Some of these proposals, such as U.S. Pat. Nos. 3,394,751 and 3,421,566 relate to movable sidewalls so that the tire tread force is communicated directly to the rim. Other proposals, such as U.S. Pat. Nos. 2,040,645; 3,392,722 and 3,610,308 have special units in the interior of the tire.

A problem that occurs in the run-flat tire and that has not been solved by these proposals is maintaining the seat of the tire beads in the rim. When a conventional pneumatic tire is inflated, the inflation pressure forces the beads against the inside edges or flanges and the bead seat of the rim, thus keeping the beads seated against the rim, thereby maintaining tire stability. Upon deflation, the force against the beads is gone, and the beads tend to unseat. This phenomenon prevents the tire from being run while flat for any appreciable distance. At the present time, if a standard pneumatic tire is run flat for some distance, the beads may unseat and subsequently demount from the rim.

An additional problem generated by tires run flat is the friction which develops from the upper and lower portions of the deflated sidewall rubbing against each other. The friction produces excess heat and causes the sidewalls to wear excessively. To reduce this friction, the inclusion of either liquid or solid lubricants on the tire interiors has been proposed. U.S. Pat. No. 2,040,645, for instance, suggests a graphite lubricant, U.S. Pat. No. 3,610,308 mentions the use of liquid silicone, and U.S. Pat. Nos. 3,739,829 and 3,850,217 describe the use of polyalkylene glycols, glycerol, propylene glycol, silicone and other lubricants.

SUMMARY OF THE INVENTION

The present invention provides a pneumatic tire which can be run flat for appreciable distances with stability and rideability superior to the run-flat tires of the past. Stability is improved through the presence of a circumferential locking lug located on the sidewall around the rim flange which locks over the flange when the tire deflates. The lug prevents the beads from unseating and keeps the tire on the wheel. Rideability is improved through the addition of steel, fabric, or rubber inserts or increased thickness in the sidewalls. The inserts or added thickness stiffens the sidewall, thereby increasing the distance between the rim and the wheel and cushioning the load for a smoother ride. The inserts or added thickness also supplies additional force to the lug when the tire is flat and aids in locking the lug over the flange. The increased thickness sidewall may contain concentric slots providing a softer ride under normal inflation.

The interior of the tire is provided with a lubricant. The preferable lubricant of the present invention is a solution of polymer molecules, with the solution preferably comprising water and ethylene glycol, with the solute being small amounts of a polyethylene oxide and a polysaccharide.

BRIEF DESCRIPTION OF THE DRAWINGS

In the drawings, which are drawn substantially to scale.

DESCRIPTION OF THE PREFERRED EMBODIMENTS

Figure 1:
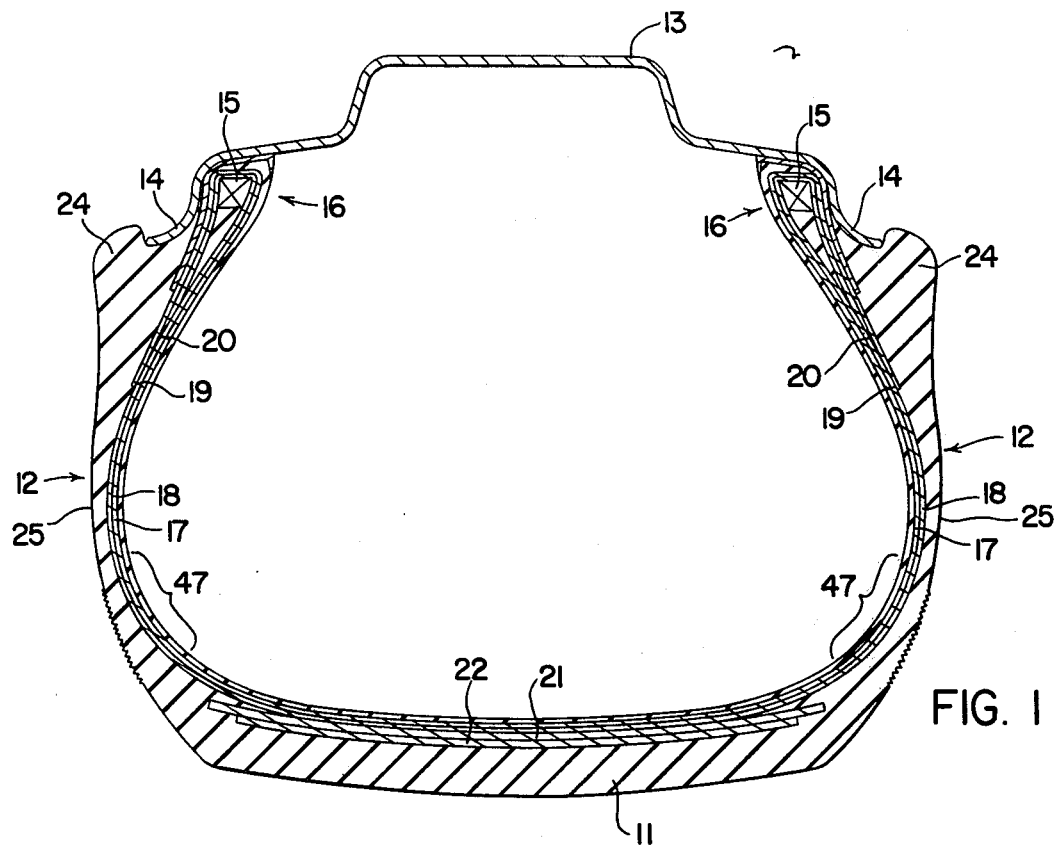
FIG. 1 is a sectional view of the tire of the present invention in its first embodiment.
Figure 3:
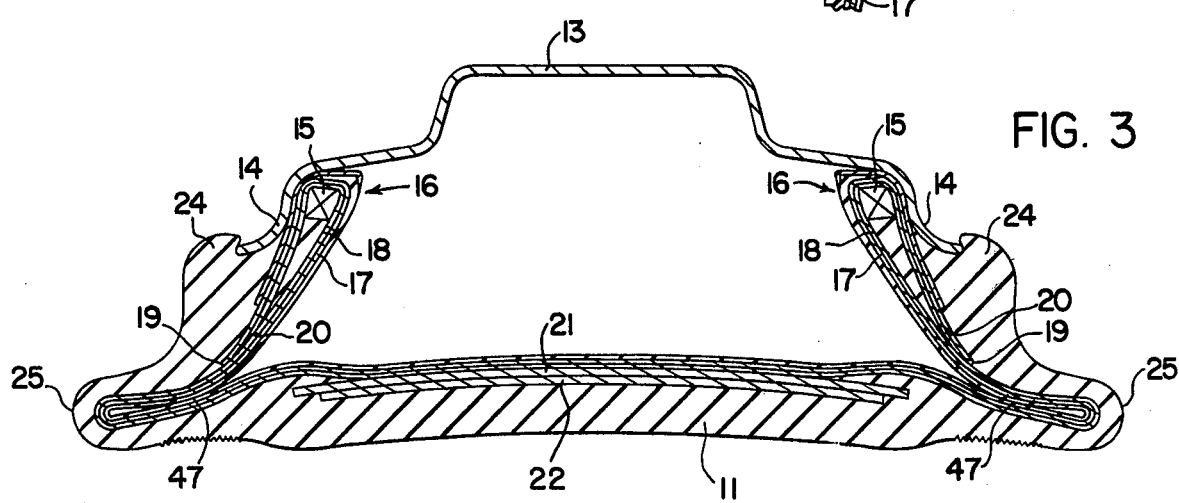
FIG. 3 is a sectional view showing the tire of FIG. 1 when deflated.

Referring more particularly to the drawings and initially to FIGS. 1 and 3, there is shown a pneumatic tire in accordance with the present invention. The tire has a thick tread portion 11 which extends circumferentially around the tire, and sidewalls 12 which extend from the tread portion along the sides of the tire. The tire is designed to be mounted on a conventional wheel rim 13 which has at its outer edges outwardly flared flanges 14 also of conventional design. Wire bead rings 15 are provided in the bead portion 16 of the tire where the sidewall meets the rim 13. In accordance with conventional tire construction, the beads are designed to keep the tire on the rim when the tire is inflated. The inflation pressure of the tire forces the beads 15 against the flange 14, keeping the tire on the rim and maintaining tire inflation.

The tires shown in the drawings are of the conventional bias-belted or radial type. These tires have two bias or radial plies 17 and 18 extending around the interior of the tire. The plies extend from bead to bead and are folded around the bead rings 15 so that the ends 19 and 20 of the plies are located in the sidewall region. There are also two steel or fabric belts 21 and 22 extending circumferentially around the interior of the tire and located directly interior to the tread portion 11. Conventional rubber compositions are used to form the tread and sidewall portions of the tire and the air-retaining inner liner.

Figure 2:
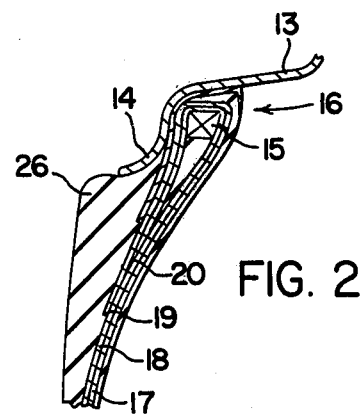
FIG. 2 is a sectional view showing another embodiment with an alternative design for the locking lug.

A novel feature of the tire of the present invention is the circumferential locking lug 24. The lug results from a specially designed increase in the thickness of the sidewall at the end of the rim flange as shown in FIGS. 1 through 3. As shown particularly in FIG. 1, the locking lug 24 does not interfere with the normal characteristics of the tire when inflated. Upon deflation, however, as shown in FIG. 3, the locking lug 24 wraps around the flange 14 to secure the tire to the rim 13. Thus, the deflated or flat tire is secured to the rim allowing the tire to be driven flat for a period of time.

As shon in FIG. 1, the design of the circumferential locking lug 24 is such that the exterior surface of the tire protrudes axially outward and radially inward at the end of the rim flange. The axially outward protrusion of the lug results in increased sidewall thickness. At the point of maximum protrusion, the sidewall thickness is about 1.5 to 3 or more times the minimum thickness of the sidewall at the sidewall midportion 25. Preferably, the maximum thickness should be at least 3 times the thickness at the midportion. The sidewall thickness gradually tapers down from this maximum point to the minimum point at the midportion 25. The radially inward protrusion of the lug results in the exterior surface of the tire extending beyond the hypothetical line of the extrapolation of the rim flange beyond the end of the flange. This lug covers the end of the flange and extends radially inward beyond the flange end for a distance about 1 to 3 or more times the thickness of the rim flange.

The advantage of this lug design can be seen in FIG. 3. Upon deflation of the tire, the sidewall folds at its midportion 25. The tapering increased sidewall thickness between the midportion 25 and the lug 24 causes the sidewall to remain relatively less flexible in this area providing a cushion between the wheel rim and the tread. The combination of the axially outward and radially inward protrusion of the lug 24 causes the lug to lock around the end of the rim flange. This locking maintains the bead portion of the tire against the rim.

Figure 1A:
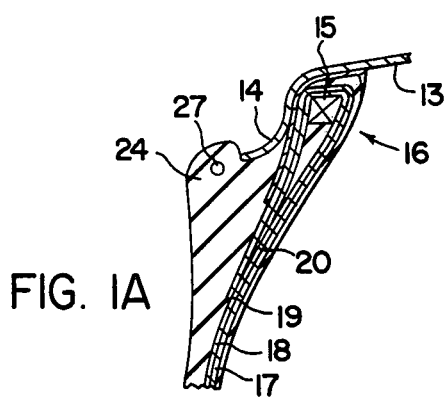
FIG. 1A is a sectional view of a portion of the tire of FIG. 1 with the addition of a circumferential wire in the locking lug.

The locking of the lug 24 over the rim flange 14 may be assisted by the addition of a circumferential wire ring in the lug illustrated in FIG. 1A. The ring 27 may be of wire or some other appropriate material. Upon deflation, the ring 27 locks the lug 24 over the end of the ring flange 14, increasing the stability of the tire.

An alternative embodiment of the present invention employs a slightly different lug design depicted in FIG. 2. This lug does not protrude as far radially outward or axially inward as lug 24. The sidewall thickness at the point of maximum protrusion of the lug is only about 2 times the minimum thickness at the sidewall midportion. The radially inward protrusion of the lug is such that it just covers the end of the rim flange but does not extend beyond the flange end. Upon deflation of the tire, lug 26 will also lock around the rim flange and keep the tire bead portion from unseating. While lug 24 is superior to lug 26 in locking around the flange, lug 26 requires less rubber and is more economical to produce.

Figure 4:
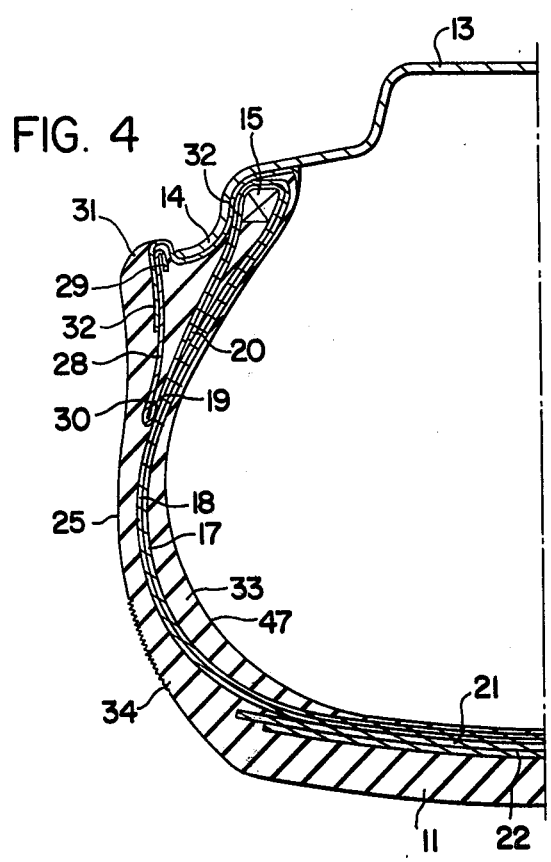
FIG. 4 is a sectional view showing a third embodiment of the present invention using a steel or fabric insert.
Figure 5:
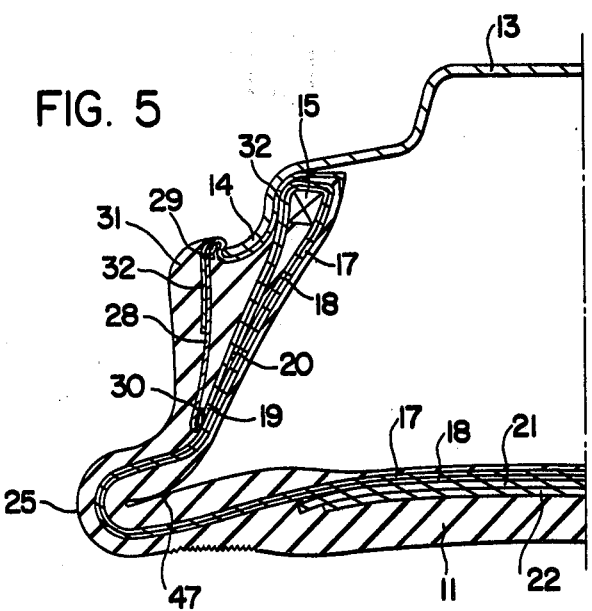
FIG. 5 is a sectional view showing the tire of FIG. 4 when deflated.

A third embodiment of the present invention incorporates a stiff insert in the sidewall portion of the tire beneath the lug as shown in FIGS. 4 and 5. This insert 28 may be made of steel or fabric such as used in the bias or radial cords. The ends 29 and 30 of the insert are folded to reduce the chance of fatigue failure. The locking lug 31 of this embodiment may be of a design similar to lug 24, as is shown in FIG. 4, or of a design similar to that of lug 26. A circumferential ring, such as ring 27 of FIG. 1A, may also be put into the lug. Upon deflation, as shown in FIG. 5, the insert 28 exerts a force upon the locking lug 31 and aids in clamping the beads 15 to the flange 14. A chafer strip 32 may also be added. The chafer is located in the sidewall directly adjacent the rim 13 and wraps over the insert 28. This protects the end 29 from wear due to rubbing against the flange 14 and aids in holding the beads to the rim when the lug locks.

Figure 6:
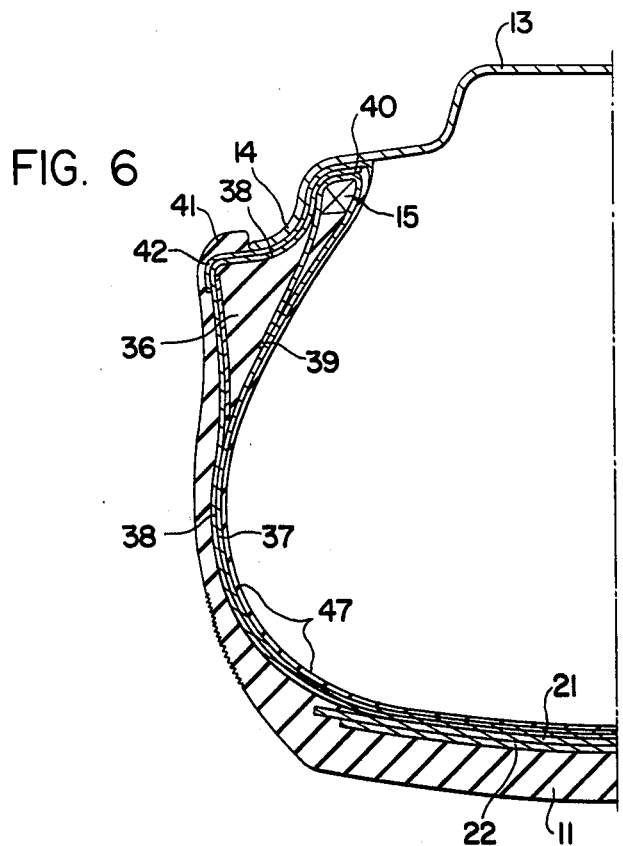
FIG. 6 is a sectional view showing a fourth embodiment with an insert of hard rim strip compound.
Figure 7:
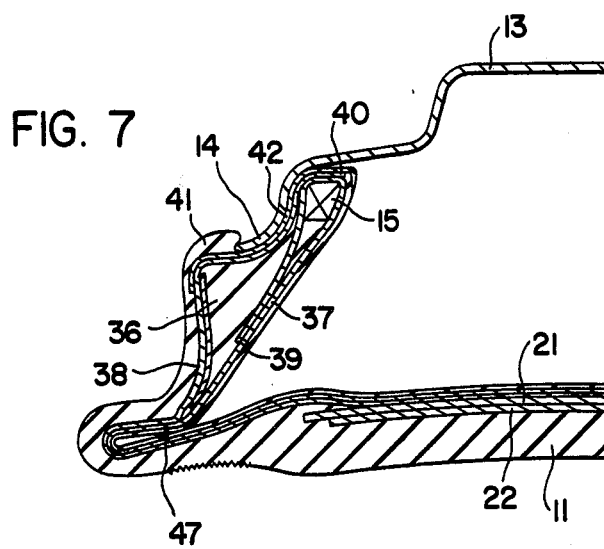
FIG. 7 is a sectional view showing the tire of FIG. 6 when deflated.

In FIGS. 4 and 5 the thickness of the sidewall is increased near the tread. This thickness may be added at sidewall region 33 interior to plies 17 and 18 between midportion 25 and tread portion 11 or at sidewall region 34 on the tire exterior midportion 25 and tread portion 11. The additional rubber resists the rolling of the tire carcass and gives a more uniform thickness in the area which will be supporting the load when the tire is flat. A fourth embodiment of the present invention is shown in FIGS. 6 and 7. This design incorporates a rubber insert 36 made of hard rim strip compound. The insert 36 is located between the bias plies so that the second ply 38 is wrapped over the insert 36. The end 39 of first ply 37 is located interior to insert 36 while the end 40 of second ply 38 is located between the beads 15 and rim 13. The circumferential locking lug 41 may use the design of lug 24 (as shown) or lug 26. A circumferential ring 27 may also be put into the lug. As in the previous embodiment, a chafer strip 42 similar to chafer 32 of the previous embodiment can be added. This design gives added stiffness. An advantage of this fourth embodiment is that all cord ends in the sidewall region near the rim are covered. This reduces the chances of fatigue failure.

Figure 8:
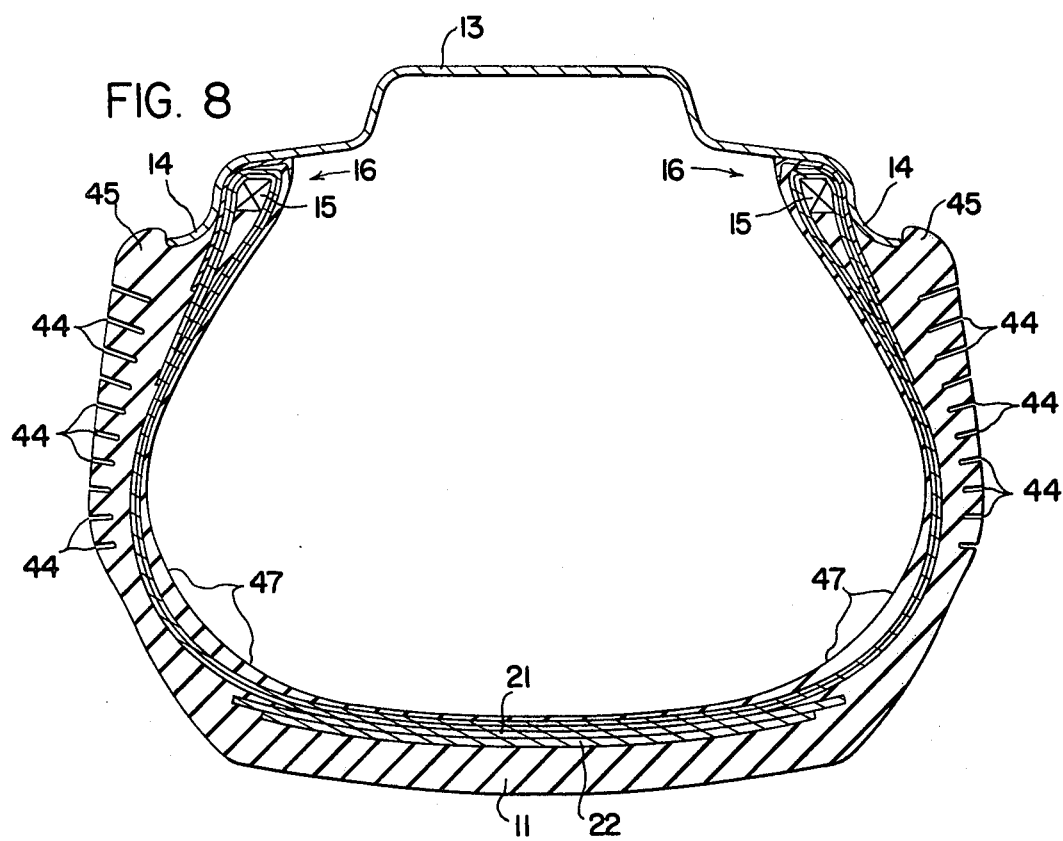
FIG. 8 is a sectional view of a fifth embodiment using concentric slots in the sidewalls.
Figure 9:
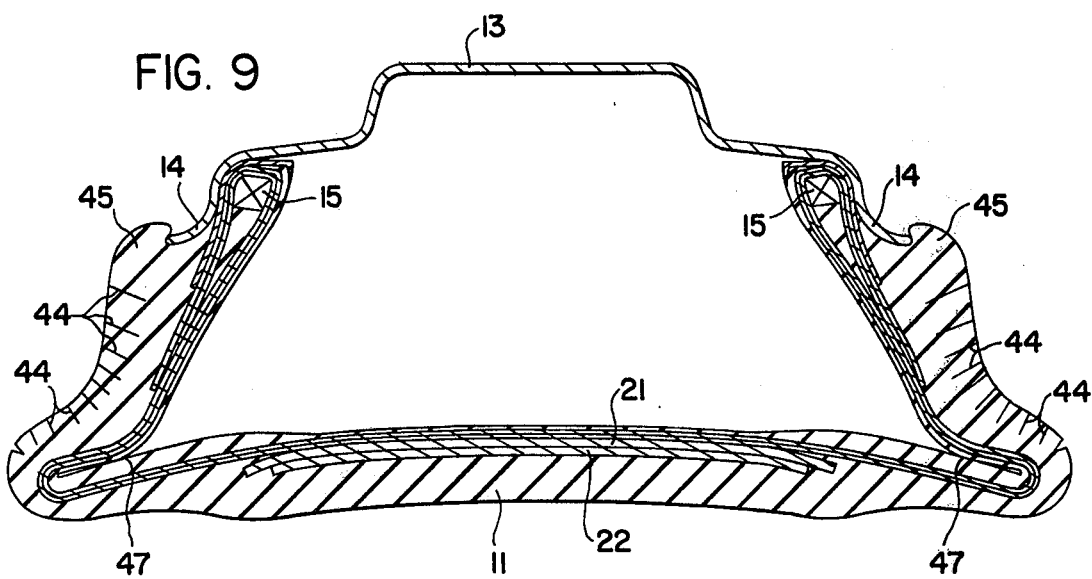
FIG. 9 is a sectional view showing the tire of FIG. 8 when deflated.

The fifth and final embodiment of the present invention is shown in FIGS. 8 and 9. In this embodiment, a plurality of regularly spaced concentric circumferential slots 44 are cut into the sidewall region below the locking lug 45. The depth of the slots is about one-third to two-thirds of the thickness of the sidewall. Preferably, the slots should extend about halfway into the sidewall. During normal inflated use of the tire, as shown in FIG. 8, the slots have little or no effect upon the performance of the tire. When the tire goes flat, as in FIG. 9, the slots 44 close causing the curvature of the sidewall to reverse forming a continuous heavy sidewall thickness. The advantage of this alternative design is that it requires no fabric inserts as in the other design used, yet upon deflation, force is exerted on the lug 45 to lock it to the flange 14 as when an insert is present. By installing slots in the sidewall the maximum amount of rubber can be used without adversely affecting performance of the tire when inflated, and a softer ride can be obtained.

The circumferential locking lug 45 shown in FIG. 8 is similar to that of lug 24; however, the design of lug 26 may also be used. In addition, a circumferential ring 27 may be inserted in the lug. As with all of the previous embodiments, the increased thickness of the sidewall tapers down from the maximum point at the lug to the minimum point at the sidewall midportion. However, since the concentric circumferential slots continue past the sidewall midportion, the sidewall thickness at the minimum point is about 2 to 3 times greater than the minimum thickness in the previous embodiments. This greater midportion thickness is attributable to the depth of the slots. The distance from the bottom of the slot to the tire interior at the sidewall midportion is approximately the same as the sidewall midportion thickness at the previous embodiments.

The depth of the slots 44 is preferably about 0.5 to 2 times the radial distance between the slots. When slots are provided, the circumferential locking lug 45 usually has a thickness of at least 0.7 inch, and preferably about 0.8 inch to about 1.5 inches. When no slots are provided, the thickness of the locking lug is preferably about 0.7 inch to about 1.2 inches. The slots make it possible to provide the sidewall portion with a substantial thickness such as 0.4 to 0.6 inch or more at the midportion while still maintaining a soft ride. The above dimensions are suitable for passenger car tires of the normal size used on standard 13-, 14- or 15-inch rims, for example.

By increasing the stiffness of the sidewall region near the rim through the use of the inserts or the slotted additional sidewall thickness, the riding performance of the flat tire is greatly improved. The stiffer sidewall increases the distance between the rim and the tread as shown in FIGS. 3, 5, 7 and 9. This improves the cushion and support of the load when the tire is flat. It also increases the force on the locking lug and thus reduces the possibility of the beads unseating and the tire eventually rolling off the rim. The stability of the flat tire is also increased by the added amount of sidewall portion near the tread that is in contact with the road; here again, the locking lug increases stability by keeping the tire on the rim.

The drawings illustrate a size BR78-13 SBR tube-less tire mounted on a standard rim, and it will be understood that a larger tire, such as size HR78-15 could have about the same shape. The rubber used in the tire can be the same as used in conventional tires, in which case the elastic rubber of the sidewall portions could be an SBR rubber with a Shore A durometer hardness in the range of 40 to 80. Butyl rubber can be used in the inner liner to provide maximum resistance to gas permeation.

In each embodiment of the invention described above, it is preferable to provide a lubricant on the interior surface of the sidewall portions at 47 to reduce the friction and heat generated by the rubbing of the upper and lower halves of the sidewalls when they are in contact during operation of the deflated collapsed tire. The lubricants for use in the present invention have excellent lubricity, are compatible with the rubber of the inner liner of the tire, are stable and operable over a wide range of temperatures and shear rates, have a viscosity and composition such that the ingredients remain uniformly distributed in service, and have puncture-sealing capability. The lubricant should be serviceable over a broad temperature range, from about $-35°$ C. to about $110°$ C.

While the run-flat tire of the present invention is believed to function best with a polymer solution lubricant, it will be understood that advantages of the invention are obtained when other suitable lubricants are used and even if no lubricant is used.

The invention as shown herein is applied to a conventional bias-belted or radial tire construction; however, it is understood that the invention can be practiced with other standard designs of tires. While the invention has been shown and described with respect to specific embodiments thereof, these are intended for the purpose of illustration rather than limitation, and other modifications and variations will be apparent to those skilled in the art all within the intended spirit and scope of the invention.

I claim:

1. A pneumatic tire to be mounted on a wheel rim having opposed annular flanges comprising:
    a. a tread portion extending circumferentially around the tire;
    b. two annular rim-engaging bead portions having bead rings embedded therein;
    c. a pair of flexible sidewall portions along the sides of the tire, each sidewall portion connecting one edge of the tread portion with the associated bead portion;
    d. carcass plies extending through said sidewall portions and folded around said bead rings so that the end portions of said plies are located in said sidewall portions;
    e. a thick circumferential lug located on each sidewall portion externally of said carcass plies and end portions thereof, said circumferential lug protruding axially outwardly and radially inwardly from said carcass plies adjacent to the bead portion and providing locking means for projecting beyond the rim flange when the tire is inflated and for hooking around the end of the flange when the tire is underinflated; and
    f. each said sidewall portion having an annular thickened section located externally of said carcass plies and end portions thereof, said annular thickened section having its thickest part located adjacent to said circumferential lug and tapering to a thinner part adjacent the middle of said sidewall portion, said annular thickened section also having a plurality of concentric circumferential slots in its external surface, said slots extending inwardly to a depth of approximately one-third to two-thirds of the distance between said external surface and said carcass plies, so that said thickened sidewall portion is relatively flexible when said tire is inflated, but when said tire is deflated, said slots close to cause said thickened sidewall portion to become relatively stiff to provide support to hold said lug hooked to said rim flange.

2. The tire of claim 1 wherein the tire contains a lubricant.

* * * * *